US006736043B1

(12) United States Patent
Eijnde

(10) Patent No.: US 6,736,043 B1
(45) Date of Patent: May 18, 2004

(54) APPARATUS FOR MACHINING VERTICAL PANELS

(76) Inventor: Mario van den Eijnde, Lavendelheide 16, 5704 HA Helmond (NL)

( * ) Notice: Subject to any disclaimer, the term of this patent is extended or adjusted under 35 U.S.C. 154(b) by 0 days.

(21) Appl. No.: 09/214,201

(22) PCT Filed: Apr. 29, 1998

(86) PCT No.: PCT/GB98/01256

§ 371 (c)(1), (2), (4) Date: May 25, 1999

(87) PCT Pub. No.: WO98/50205

PCT Pub. Date: Nov. 12, 1998

(Under 37 CFR 1.47)

(30) Foreign Application Priority Data

May 1, 1997 (GB) ............................................. 9708813

(51) Int. Cl.$^{7}$ ............................. B26D 1/18; B27B 5/06; B23C 1/12

(52) U.S. Cl. ........................ 83/471.3; 83/473; 83/477.1; 83/486.1; 83/488; 83/574; 144/241; 409/212; 409/230

(58) Field of Search ............................. 83/471.3, 471.2, 83/473, 477, 477.1, 486, 486.1, 488, 489, 490, 491, 487, 574, 581, 565, 614; 144/20, 35.1, 46, 48, 241; 409/182, 183, 197, 204, 211, 212, 218, 230

(56) References Cited

U.S. PATENT DOCUMENTS 3,283,790 A * 11/1966 Strixbig et al. ............ 83/471.3
3,565,139 A * 2/1971 Olson .......................... 83/859
3,890,861 A * 6/1975 Gebhardt ........................ 83/23
3,945,285 A * 3/1976 Gebhardt .................... 83/437.3
4,150,597 A * 4/1979 Striebig ...................... 83/471.3
4,167,434 A * 9/1979 Morgan ....................... 156/510
4,181,054 A * 1/1980 Striebig ........................ 83/153
4,202,231 A * 5/1980 Striebig ........................ 83/453
4,631,999 A * 12/1986 Striebig ...................... 83/471.2
4,738,571 A * 4/1988 Olson et al. .................. 408/67
4,802,399 A * 2/1989 Olson .......................... 384/55
4,830,555 A * 5/1989 Conachen ................... 409/178
5,404,779 A * 4/1995 Break ........................ 83/471.3
5,568,756 A 10/1996 Peterson
5,664,612 A * 9/1997 Klemma .................. 144/134.1

FOREIGN PATENT DOCUMENTS

DE 0 100 065 7/1983 ............. B27F/5/12
GB 1575432 9/1980 ............. B27B/5/06

* cited by examiner

*Primary Examiner*—Boyer D. Ashley
(74) *Attorney, Agent, or Firm*—Lahive & Cockfield, LLP

(57) ABSTRACT

An apparatus for machining vertical panels is provided including a frame 10 for supporting a panel in a substantially vertical plane, a tool mount 22, and a mechanism 14, 18, 20 supporting the tool mount 22 for movement in two directions over the panel plane. The tool mount 22 has an axis 24 along which a tool on the mount can be moved towards and away from the panel plane and about which the tool can be rotated to change its orientation relative to the panel plane.

5 Claims, 1 Drawing Sheet

APPARATUS FOR MACHINING VERTICAL PANELS

Figure 1:
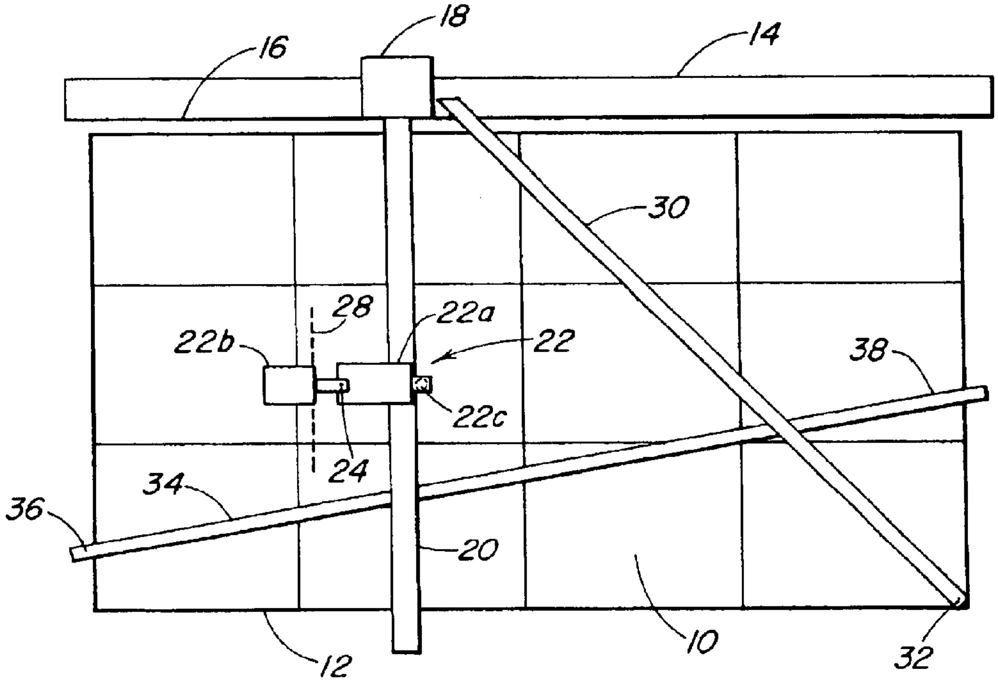

This invention relates to an apparatus for machining vertical panels, and in particular to vertical panel saws.

BACKGROUND

Vertical panel saws are used to cut large panels, for example four meters by two meters, into pieces shaped and dimensioned for specific purposes. A typical use might be to cut plastics or coated panels for use as kitchen worktops.

To conserve floor area in the factory or workshop, panels of this size are often cut when standing on one edge, i.e. with the panel in a vertical or near vertical plane, and it has been common practice to locate the panel on rollers to make it easier to feed the panel past a vertically adjustable circular saw to make horizontal cuts or to locate the panel correctly for a vertical cut. As these panels are heavy and awkward to Move, even on rollers, considerable manual labour is still involved in moving the panels. More important, however is the fact that cutting, for example, a four meter panel requires four meters of clear space on either side of the saw or, a total of eight meters. This amount of space is not always readily available.

It is an object of the present invention to provide an apparatus for machining vertical panels that obviates or mitigates these problems.

SUMMARY

The present invention is an apparatus for machining vertical panels, the apparatus comprising a frame for supporting a panel in a substantially vertical plane, a tool mount, and a mechanism supporting the tool mount for movement in two directions over the panel plane, the tool mount having an axis about which a tool on the mount can be rotated to change its orientation relative to the panel plane.

The mount may have a second axis about which the tool on the mount can be rotated to change its inclination relative to the panel plane.

Preferably one of the axes is perpendicular to the plane and the other axis is parallel to the plane.

A tool on the mount may be movable towards and away from the panel plane.

The frame may include a member and means for adjusting the inclination of the member to the horizontal, the mount including means for engaging the member to guide movement of the mount.

Preferably two such members are provided, one spanning the horizontal edges of the panel plane and the other spanning the vertical edges of the panel plane.

The present invention is also apparatus as defined in any of the last six preceding paragraphs in which a tool is mounted on the tool mount.

Preferably the tool is a circular saw.

DETAILED DESCRIPTION

An embodiment of the present invention will now be described, by way of example, with reference to the accompanying FIGURE, which is a diagrammatic elevation or a vertical panel saw according to the present invention.

Referring now to the drawing, a vertical panel saw according to the present invention comprises a frame 10 which defines a substantially vertical panel plane in which a panel can be placed, the panel being supported along a bottom edge 12 or the frame 10. The frame 10 is a lattice structure to provide adequate support while maintaining the panel for a reasonable weight of frame.

A first rail 14 integral with the frame 10 is located above 9 top edge 16 of the frame. The first rail it supports a travelling carriage 18 from which depends a column 20 in which a tool mount 22 is vertically moveable. The column 20 and tool mount 22 are spaced along front of the panel plane to be clear of the surface of a panel in the panel plane.

The tool mount 22 is essentially two interconnected members **22*a* and 22*b*, the first member 22*a* being secured to the column 20 and the second member 22*b* mounting a circular saw and being attached to the first member 22*a* while being adjustable relative to the first member 22*a* in three ways. The first adjustment is a translation along a normal axis 24 perpendicular to the panel plane and allows an operator to move a saw mounted on the second member 22*b* into and out of engagement with a panel. The second adjustment is a 90° rotation about the normal 24 to ensure that the saw can be correctly oriented or aligned with its direction of cut. The third adjustment is a 45° rotation about a parallel axis 28** parallel to the panel plane to allow the saw blade to be inclined relative to the panel surface for bevel cutting.

The second and third adjustments (about the normal and parallel axes 24 and 28) are made against scales indicating the angle or rotations. Means (not illustrated) are provided to lock the selected angle of rotation until a fresh angle of rotation is required.

Using the apparatus as described above allows the operator to control movement of the tool mount 22 to cut a panel in the frame 10 at any angle between horizontal and vertical, with the blade of the saw aligned with the intended direction of cut, and with the cut bevelled at any angle between 0° and 45°. Moreover, the operator can start and finish a cut where desired by moving the second member **22*b*** and the saw mounted on it into and out of engagement with the panel.

In many situations it is desired to cut obliquely across a panel, e.g. when cutting a panel to mate with another panel at a corner, and to assist in this operation a member such as a rail 30 is provided. The rail 30 is pivotally mounted at a corer 32 of the frame and extends upwardly to cross the top edge 16 of the frame where a scale is provided giving the angle of inclination of the rail 30. On the tool mount is provided a clamp means, such as a guide or roller **22*c*** which engages the rail and causes the mount and the saw mounted on it to follow the rail.

A second member or rail 34 is provided extending across the frame 10 between vertically adjustable end pieces 36 and 38; this second rail 34 allows panels to be cut with a taper running the length of the panel.

While the apparatus of the invention is primarily intended for use with a circular saw, it can also be used with other tools mounted on the tool mount 22, for example a router. The tools can be standard portable tool, a suitable saw for example being a Holz Her 2120 available from Karl M Reich Maschinenfabrik GmbH of Nurtingen, Germany. Of course, if preferred, a saw or other tool could be mounted semi-permanently on the tool mount 22.

Having described the invention and an embodiment thereof, what is claimed as new and secured by Letters Patent is:

1. Apparatus for machining vertical panels, the apparatus is comprising:

a frame for supporting a panel in a substantially vertical plane, a movable column supported relative to an edge of said frame, the column being movable in a second plane located parallel to that of the panel when present, a rotatable tool mount coupled to said column such that the tool mount is movable along a length of the column and arranged such that the tool mount is directed horizontally, vertically and at any intermediate angle along said panel, the tool mount also permitting a tool to enter the substantially vertical plane at an angle;

wherein said frame further carries a guide rail which is attached by a pivot to an edge of the frame, the tool mount additionally including a clamp means whereby the tool mount may be linked to the guide rail to locate the tool to produce a controlled cut line on the panel which is at a predetermined angle to a panel edge.

2. Apparatus according to claim 1, in which said frame has a second guide rail attached thereto.

3. Apparatus as claimed in any one of claims 1 to 2, in which the tool mount includes means for moving the tool into or out of contact with a panel in the frame.

4. Apparatus as claimed in claim 3, further comprising at least one of the group of a circular saw and a router mounted to said tool mount.

5. Apparatus as claimed in claims 1 to 2, further comprising at least one of the group of a circular saw and a router mounted to said tool mount.

* * * * *